May 4, 1965  E. B. CANDELL  3,181,694
SHIPPING AND DISPLAY CARTON
Filed Aug. 22, 1963  3 Sheets-Sheet 1
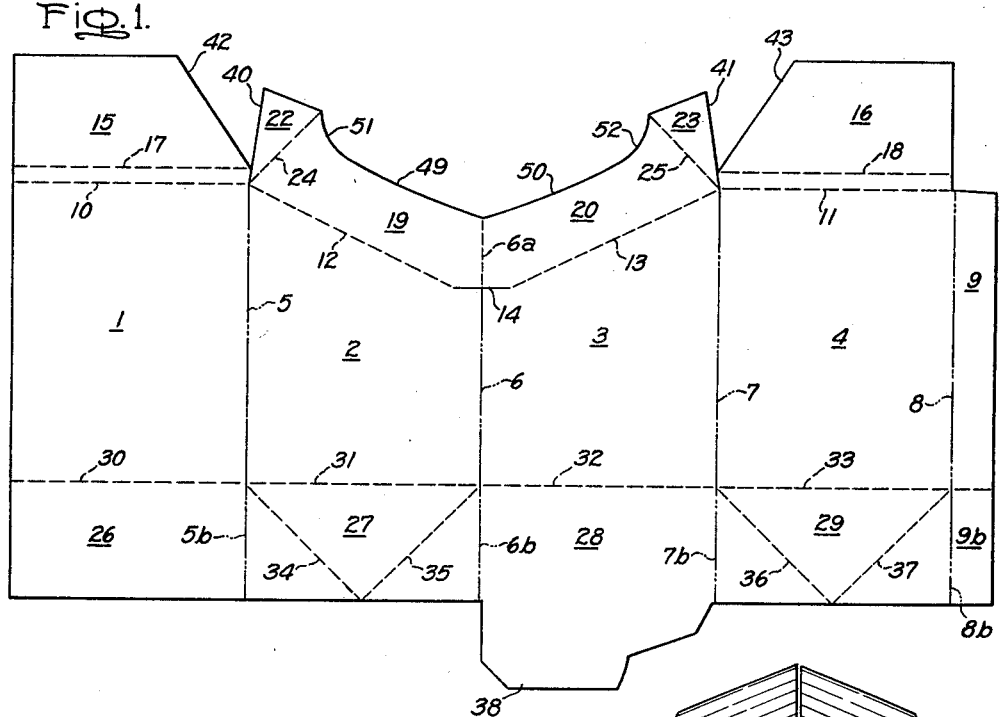
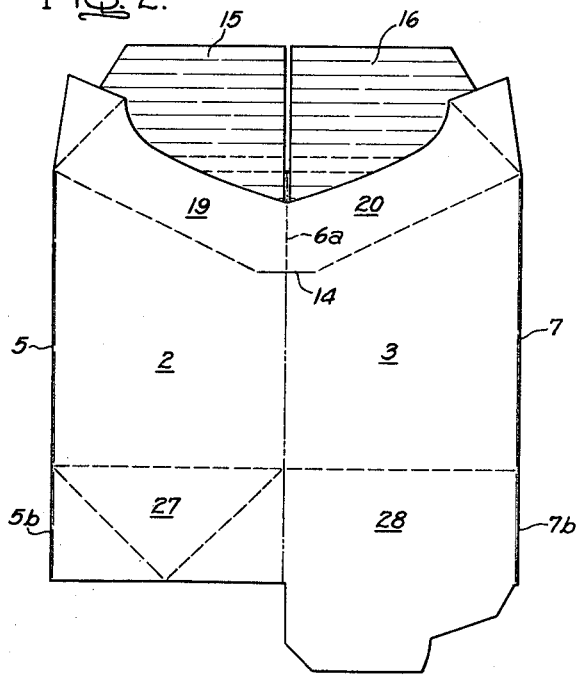
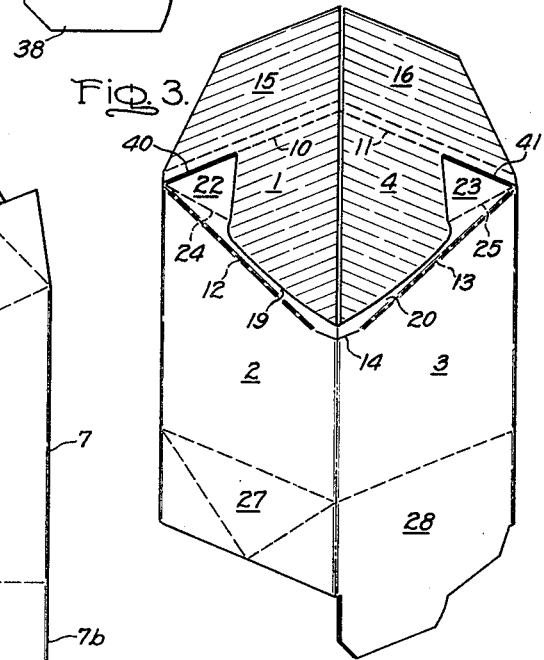
Inventor:
Earl B. Candell
by Otto Tichy
His Attorney May 4, 1965

E. B. CANDELL 3,181,694

SHIPPING AND DISPLAY CARTON

Filed Aug. 22, 1963

Inventor:
Earl B. Candell
by Otto Tichy
His Attorney

May 4, 1965 E. B. CANDELL 3,181,694
SHIPPING AND DISPLAY CARTON
Filed Aug. 22, 1963 3 Sheets-Sheet 3
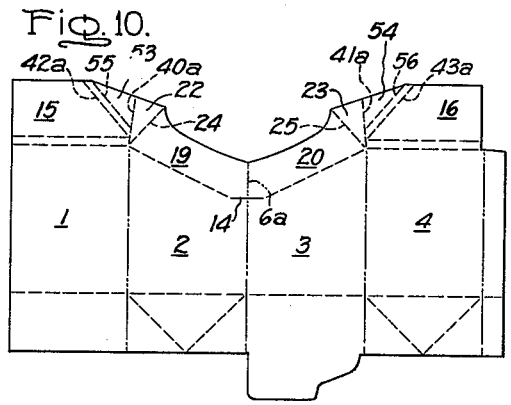
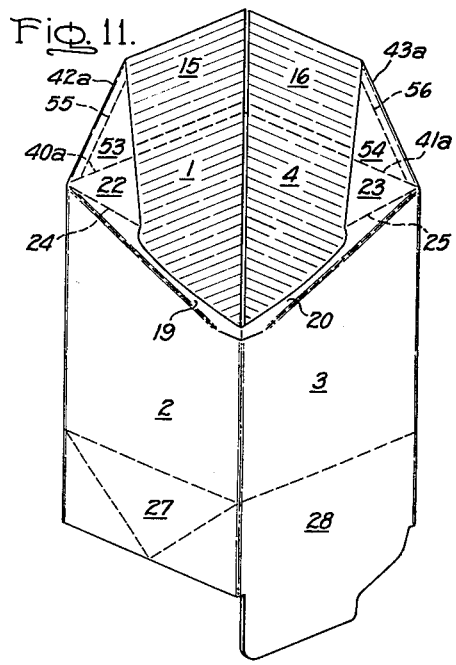
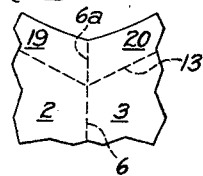
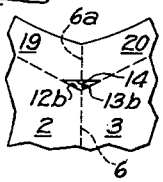
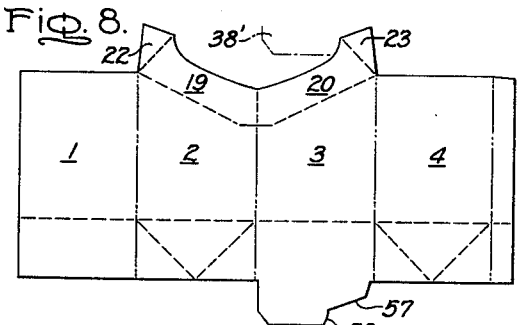
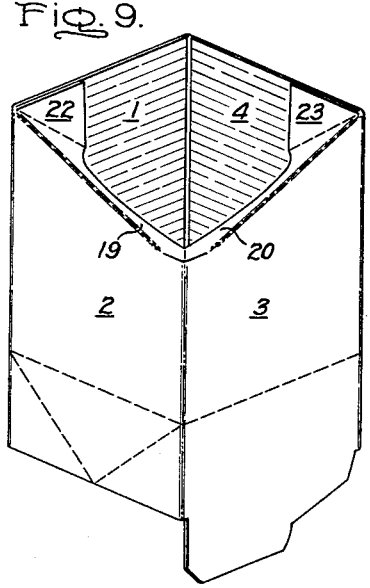
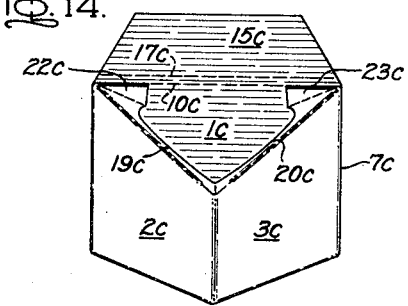
Inventor:
Earl B. Candell
by Otto Tichy
His Attorney

United States Patent Office 3,181,694
Patented May 4, 1965

3,181,694
SHIPPING AND DISPLAY CARTON
Earl B. Candell, Shaker Heights, Ohio, assignor to General Electric Company, a corporation of New York
Filed Aug. 22, 1963, Ser. No. 303,748
11 Claims. (Cl. 206—45.14)

This invention relates generally to paperboard cartons or more particularly to cartons useful for the shipping and display of articles such as electric lamp bulbs.

It is an object of the invention to provide a carton which will permit the top of the lamp or other article to be exposed for viewing and inspection and yet provide a firm support of the article for shipment. It is a further object to provide a carton which is readily assembled without the need for gluing and stapling aside from the conventional manufacturer's glue flap at one corner of the carton.

In accordance with the invention, the novel carton structure is characterized by an open top which is partially closed by oblique flaps hingedly connected to oblique or diagonal upper edges of two adjacent side walls of the carton and projecting into the interior of the carton from said oblique upper edges. Inner flap extensions are hingedly connected to the remote free ends of said oblique flaps and are each held against the inner surface of a remaining side wall or walls of the carton in any suitable manner. While the said inner flap extensions may be held in place by glue or staples, for example, they are preferably held by hold-down or end flaps hingedly connected to the upper edges of said remaining side walls and folded down against the inner surfaces thereof over said inner flap extensions. Thereby the article contained in the carton bears against the edges of said oblique flaps and also against the surfaces of said hold-down flaps which in turn hold in place the inner flap extensions and, thereby, the oblique flaps.

Further features and advantages of the invention will appear from the following detailed description of species thereof and from the drawings wherein:

FIG. 1 is a plan view of a blank from which the carton is formed in accordance with the invention;

FIG. 2 is a plan view of the blank as folded flat and glued together at one corner;

FIGS. 3 to 6 are perspective views showing various stages of assembly of the carton;

FIG. 8 is a plan view of a modified carton blank;

FIG. 9 is a perspective view of a carton formed from the FIG. 8 blank in an assembly stage corresponding to FIG. 3;

FIG. 10 is a plan view of a further modification of the carton blank;

FIG. 11 is a perspective view showing an assembly stage of the FIG. 10 blank corresponding to FIG. 3;

FIGS. 12 and 13 are fragmentary plan views of modifications of the carton blank; and FIG. 14 is a perspective view of another modified carton.

Figure 4:
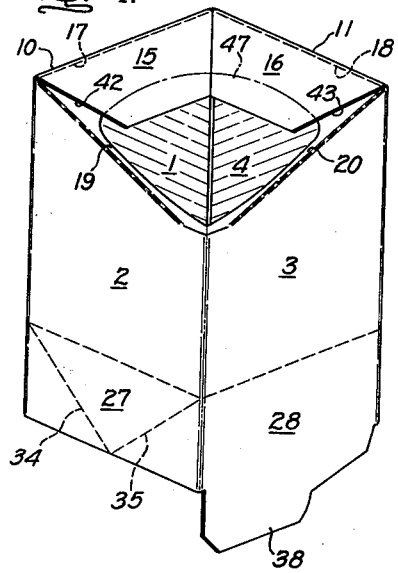

Referring to FIG. 1 of the drawing, the single piece blank is divided into four side walls or panels 1 to 4 by vertical score lines 5 to 8, with a manufacturer's glue flap 9 at one side. The upper edges of panels 1 and 4 are defined by horizontal score lines 10 and 11, whereas the upper edges of the two adjacent panels 2 and 3 are defined by oblique or diagonal score lines 12 and 13 which extend downwardly at acute angles to the horizontal from the upper ends of score lines 5 and 7 and preferably terminate at points closely adjacent the common score line 6 where they are joined by a short horizontal cut or slit 14 extending across said common line 6. Hold-down flaps 15 and 16 are hingedly connected to the upper ends of the respective side walls 1 and 4 and are scored along lines 17 and 18 which are parallel to score lines 10 and 11 and separated therefrom a distance about twice the thickness of the material of which the carton is formed, preferably single faced corrugated paperboard. Oblique flaps 19 and 20 are hingedly connected to the oblique upper edges 12 and 13 of the adjacent side walls 2 and 3 and are joined together at their promixate ends preferably with a hinged connection formed by the score line 6a which is a continuation of the score line 6. Inner flap extensions or ears 22 and 23 are hingedly connected to the free remote ends of the oblique flaps 19 and 20 by score lines 24 and 25 which extend laterally from the outer ends of score lines 12 and 13 at slightly less than right angles thereto.

The bottom of the carton is closed by any convenient arrangement of flaps, in this case a bellows arrangement of flaps 26 to 29 which are hingedly connected to the bottom of the side walls 1 to 4 by horizontal score lines 30 to 33, and are hingedly connected together by vertical score lines 5b, 6b and 7b which are continuations of respective score lines 5, 6 and 7. Flaps 27 and 29 are scored by respective pairs of oblique lines 34, 35 and 36, 37 along which the flaps are folded for assembly, and flap 28 is provided with an extension 38 which is tucked under flap 26 during assembly. The glue flap 9 is extended at 9b along the edge of flap 29 from which it is separated by score line 8b.

The blank is folded along the score lines 5–5b, 6–6b and 7–7b, glue is applied along the underside of flap 9–9b and it is glued to the edge of side panel 1 and bottom flap 26 to form the folded blank shown in FIG. 2. It will be understood that the glue flap 9–9b is preferably constituted of the facing paper alone, i.e., the corrugated paper is omitted thereat.

The carton is squared or erected by applying pressure laterally to the edges or corners 5 and 7 of the folded blank of FIG. 2 and, at the same time, the oblique flaps 19 and 20 are pushed in and down, preferably by the application of a counter pressure in the vicinity of the score line 6a. The oblique flaps 19 and 20 are pushed in and down to the position shown in FIG. 3, with the inner flap extenisons or ears 22 and 23 folded along score lines 24 and 25 and against the inner surfaces of respective side walls 1 and 4 until the edges 40 and 41 of flap extensions 22 and 23 lie along the respective score lines 10 and 11. The oblique flaps then lie in respective planes including the upper oblique edges 12 and 13 of respective adjacent side walls 2 and 3 and projecting inwardly and downwardly toward the interior of the carton. The proper positioning of the oblique flaps 19 and 20, slanting inward and down at an angle, is achieved by the presence of the cut 14 and is assisted by the score line 6a. It will be evident that the oblique upper edges 12 and 13 extend downwardly at acute angles to the horizontal from remote diagonal corners toward the common corner of walls 2 and 3 in a downwardly inclined V formation. It will also be evident that the oblique flaps 19 and 20 are relatively narrow to leave a large opening in the top of the carton.

The hold-down flaps 15 and 16 are then bent inward and down against the inner surfaces of respective side walls 1 and 4 and over the respective inner flap extensions 22 and 23 as shown in FIG. 4. The oblique inner side edges 42 and 43 of the trapezoidal flaps 15 and 16 are thus aligned with the respective score lines 24 and 25 and are thereby tucked into the corners formed along said lines 24 and 25 by the folded inner flaps 22 and 23.

Figure 7:
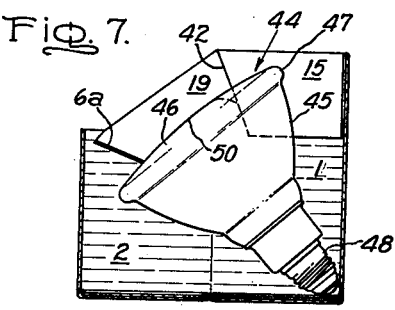
FIG. 7 is an elevation in cross section taken through diagonally opposed corners of the carton and showing a lamp contained therein.

The lamp for which the particular carton illustrated herein was designed, is shown in FIG. 7 as a reflector or projector lamp 44 of a type designated commercially as PAR 38. It comprises a relatively heavy molded glass bulb comprised of a main reflector section 45 and a slightly convex cover section 46 fused together at their rims 47. The bulb 44–45 contains a filament (not shown) which is connected to the contacts of a conventional screw base 48 attached to the end of the reflector section of the bulb.

Figure 6:
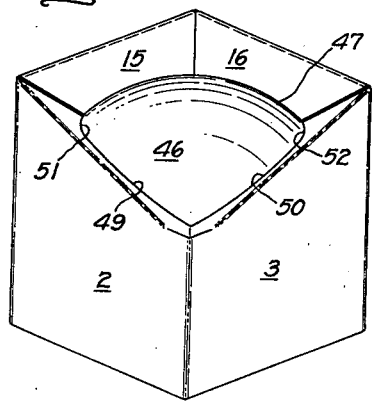

The lamp 47 is inserted into the open bottom of the carton at the FIG. 4 stage of assembly, with the cover glass 46 up and the base 48 down and at the corner common to the adjacent edges of panels 1 and 4. The face of the cover glass 46 bears against the cut edges 49 and 50 of the oblique flaps 19 and 20, and the rim 47 bears against the faces of the hold-down flaps 15 and 16, as shown in dot-dash lines in FIG. 4 and as also shown in FIG. 6. It is for the purpose of accommodating the rim 47 of the lamp that the said edges 49 and 50 of flaps 19 and 20 are curved upwardly as shown at 51 and 52 in FIGS. 1 and 6.

Figure 5:
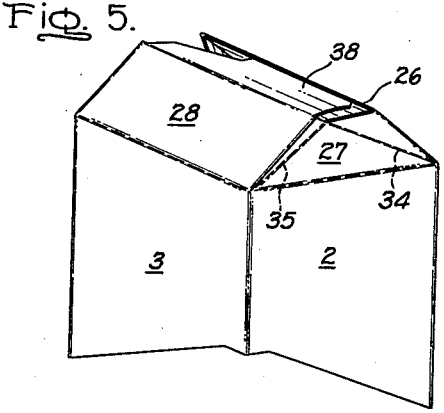

The bottom of the carton is formed by pushing in flaps 27 and 29 and folding them along the respective pairs of score lines 34–35 and 36–37 as shown in FIG. 5. The extension or tuck 38 of flap 28 is pushed under flap 26 to lock the bottom.

There is thereby formed from one piece of material an open end display carton which holds the article, in this case an electric lamp, firmly in place, cushions it against shocks incurred in shipping and handling, and displays the important features of the article. The carton is easily formed without the need for fixtures or jigs and without the need for glue, staples or extraneous interlocking devices.

Referring to FIGS. 8 and 9 of the drawing, the carton shown therein is like that shown in FIGS. 1 to 7 except that the hold-down flaps 15 and 16 are omitted, and the inner flaps or extensions of the oblique flaps 19 and 20 are affixed to the inner surfaces of respective side walls 1 and 4 in any suitable manner, as by gluing, stapling, crimping, etc.

Referring to FIGS. 10 and 11, the carton shown therein is again like that of FIGS. 1 to 7 except that there are no V-shaped cut-outs between the edges 40–42 of flaps 22 and 15 and the edges 41–43 of flaps 23 and 16 as in FIG. 1. Instead, the material is retained to form additional triangular panels or webs 53 and 54. Web 53 is hingedly connected to flaps 22 and 15 by the score lines 40a and 42a, and web 54 is similarly hingedly connected to panels 23 and 16 by score lines 41a and 43a. Webs 53 and 54 are additionally scored along lines 55 and 56 which are parallel to respective score lines 42a and 43a and are spaced therefrom a distance about equal to the thickness of the carton material.

The carton of FIGS. 10 and 11 is set up or formed similarly to that of FIGS. 1 to 7, with FIG. 11 showing a stage corresponding to FIG. 3. The scoring is such that the panels 53 and 54 fold inward against the inner surface of respective flaps 15 and 16 and then over the respective inner flaps 22 and 23 with the material between score lines 42a–55 and 43a–56 alongside the corners formed at score lines 24 and 25. The score line 6a hingedly connecting the oblique flaps 19 and 20 may be omitted, but it is preferably present to facilitate proper folding of the flaps 19 and 20.

The FIGS. 10 and 11 construction has the advantage of greater strength by virtue of the positive connection between flaps 15–22 and 16–23 in the form of the connecting webs or panels 22 and 23, thereby even more firmly retaining the oblique flaps 19 and 20 in place. On the other hand, the structure of FIGS. 1 to 7 is more readily and expeditiously set up.

It will be seen in FIGS. 6 and 7 that the lamp 44 is firmly held in the carton with its longitudinal axis substantially coincident with a diagonal axis of the rectangular carton, its base 48 nested in a lower corner, its face 46 bearing against the edges 49 and 50 of the oblique flaps 19 and 20, or at least against portions thereof such as the curved end portions 51 and 52, its rim 47 bearing against the walls 2 and 3 and against the faces of the hold-down flaps 15 and 16 which serve to retain the oblique flaps 19 and 20 in place by virtue of their overlapping engagement with the flap extensions or ears 22 and 23 which are thereby pressed against the inner surfaces of the side walls 1 and 4. In the FIG. 9 carton, the oblique flaps 19 and 20 are retained in place by attachment of the flap extensions 22 and 23 directly to the walls 1 and 4 in any suitable manner, for example by glueing or stapling.

FIGS. 12 and 13 show alternative structures forming the apex of the oblique upper edges defined by score lines 12 and 13, wherein the said score lines are simply continued all the way to the common corner or score line 6 of the walls 2 and 3, and the score line 6a is continued down to the apex of the V formed by score lines 12 and 13. In erecting the carton, the oblique flaps 19 and 20 are pushed in and down as described in connection with the FIG. 1 blank. In FIG. 13 a triangular piece of material is removed along boundaries formed by the short horizontal cut 14 and continuations 12b and 13b of the oblique score lines 12 and 13.

It might be mentioned that the irregular shape of the corner of flap 28 represented by the edges 57 and 58 comes about in minimizing the amount of scrap material between successive blanks occasioned by the oblique flaps 19 and 20. To that end, the portion 38 of the flap 28 of a preceding blank is formed from material left by the oblique edge 50 of flap 20. This is indicated in FIG. 8 by the showing in dot-dash lines of a portion of the flap extension 38' of a preceding blank corresponding to the flap extension 38.

It will also be evident that the principle of the oblique flaps 19 and 20 may be applied to cartons of polygonal shapes other than rectangular or square. For example, as shown in FIG. 14, a triangular carton having three side walls, 1c, 2c and 3c would be similar to those described above except that the walls 1 and 4 of the previously described cartons would be formed into a single wall 1c connecting the remote corners or edges 5c and 7c of the adjacent walls 2c and 3c and having connected to its upper edge 10c a single end flap 15c which corresponds to end flaps 15 and 16 and folds down over the flap extensions or ears 22c and 23c to hold those ears and the oblique flaps 19c and 20c in place. The bottom may be closed in any suitable manner.

It will be evident to those skilled in the art that other modifications, changes or omissions may be made in the construction and shape of the various elements of the carton within the spirit and scope of the invention as defined in the appended claims.

What I claim as new and desire to secure by Letters Patent of the United States is:

1. A paperboard shipping and display carton having a plurality of side walls defining an enclosure, bottom closure means, and an open top, two adjacent side walls having oblique upper edges extending downwardly at acute angles to the horizontal from remote diagonal corners toward the common corner of said two adjacent side walls in a downwardly inclined V formation, oblique flaps hingedly connected to respective said oblique edges and connected together at their proximate ends adjoining said common corner, said oblique flaps projecting laterally and downwardly into the interior of the carton from said oblique edges and being relatively narrow to leave a large opening in the top of the carton, inner flap extensions hingedly connected to the free remote ends of respective oblique flaps and each lying flat against the inner surface of a remaining side wall of the carton, and means to retain each of said inner flap extensions in place against said remaining side wall.

2. A carton as set forth in claim 1 wherein the last named retaining means comprises end flap means hingedly connected to a said remaining side wall and folded down over each said inner flap extension to hold it in place.

3. A paperboard shipping and display carton having four side walls, bottom closure means, and an open top, two adjacent side walls having oblique upper edges extending downwardly at acute angles to the horizontal from remote diagonal corners toward the common corner of said two adjacent side walls in a downwardly inclined V formation, oblique flaps hingedly connected to respective said oblique edges and connected together at their proximate ends adjoining said common corner, said oblique flaps projecting laterally and downwardly into the interior of the carton from said oblique edges and being relatively narrow to leave a large opening in the top of the carton, inner flap extensions hingedly connected to the free remote ends of respective oblique flaps and lying flat against the inner surfaces of the respective remaining two side walls of the carton, and means to retain said inner flap extensions in place against said remaining side walls.

4. A carton as set forth in claim 3 wherein the last named retaining means comprises end flaps hingedly connected to the upper edges of respective said remaining two side walls and folded down over said inner flap extensions against the inner surfaces of the respective said remaining two side walls.

5. A carton as set forth in claim 3 wherein the last named retaining means comprises end flaps hingedly connected to the upper edges of respective said remaining two side walls and each also hingedly connected by an intermediate web panel to the sides of the associated end flap and inner flap extension, said web panels folded down over the respective inner flap extensions and said end flaps folded down over respective said web panels and against the inner surfaces of the respective said remaining two side walls.

6. A paperboard shipping and display carton having four side walls, bottom closure means, and an open top, two adjacent side walls having oblique upper edges extending downwardly at acute angles to the horizontal from remote diagonal corners in a downwardly inclined V formation to points closely adjacent the common corner of said two adjacent side walls where they are joined by a short horizontal cut extending across said common corner, oblique flaps hingedly connected to respective said oblique edges and connected together at their proximate ends adjoining said common corner, said oblique flaps projecting laterally and downwardly into the interior of the carton from said oblique edges and being relatively narrow to leave a large opening in the top of the carton, inner flap extensions hingedly connected to the free remote ends of respective oblique flaps and lying flat against the inner surfaces of the respective remaining two side walls of the carton, and means to retain said inner flap extensions in place against said remaining side walls.

7. A carton as set forth in claim 6 wherein the last named retaining means comprises end flaps hingedly connected to the upper edges of respective said remaining two side walls and folded down over said inner flap extensions against the inner surfaces of the respective said remaining two side walls.

8. A carton as set forth in claim 6 wherein the last named retaining means comprises end flaps hingedly connected to the upper edges of respective said remaining two side walls and each also hingedly connected by an intermediate web panel to the sides of the associated end flap and inner flap extension, said web panels folded down over the respective inner flap extensions and said end flaps folded down over respective said web panels and against the inner surfaces of the respective said remaining two side walls.

9. In combination, a paperboard shipping and display carton having a plurality of side walls defining an enclosure, bottom closure means, and an open top, two adjacent side walls having oblique upper edges extending downwardly at acute angles to the horizontal from remote diagonal corners toward the common corner of said two adjacent side walls, oblique flaps hingedly connected to respective said oblique edges and connected together at their proximate ends adjoining said common corner, said oblique flaps projecting laterally and downwardly into the interior of the carton from said oblique edges, inner flap extensions hingedly connected to the free remote ends of respective oblique flaps and each lying flat against the inner surface of a remaining side wall of the carton, and means to retain each of said inner flap extensions in place against said remaining side wall, and an article disposed in said carton and confined longitudinally between the bottom closure means and the inwardly projecting edges of said oblique flaps.

10. In combination, a paperboard shipping and display carton having a plurality of side walls defining an enclosure, bottom closure means, and an open top, two adjacent side walls having oblique upper edges extending downwardly at acute angles to the horizontal from remote diagonal corners toward the common corner of said two adjacent side walls, oblique flaps hingedly connected to respective said oblique edges and connected together at their proximate ends adjoining said common corner, said oblique flaps projecting laterally and downwardly into the interior of the carton from said oblique edges, inner flap extensions hingedly connected to the free remote ends of respective oblique flaps and each lying flat against the inner surface of a remaining side wall of the carton, and means to retain each of said inner flap extensions in place agains said remaining side wall comprising end flap means hingedly connected to said remaining side wall and folded down over each said inner flap extension to hold it in place, and an article disposed in said carton and confined longitudinally between the bottom closure means and the inwardly projecting edges of said oblique flaps, with portions of said article bearing against the faces of said end flaps to thereby retain in place said inner flap extensions and said oblique flaps.

11. In combination, a paperboard shipping and display carton having four side walls, bottom closure means, and an open top, two adjacent side walls having oblique upper edges extending downwardly at acute angles to the horizontal from remote diagonal corners toward the common corner of said two adjacent side walls, oblique flaps hingedly connected to respective said oblique edges and connected together at their proximate ends adjoining said common corner, said oblique flaps projecting laterally and downwardly into the interior of the carton from said oblique edges, inner flap extensions hingedly connected to the free remote ends of respective oblique flaps and lying flat against the inner surfaces of the respective remaining two side walls of the carton, and means to retain said inner flap extensions in place against said remaining side walls comprising end flaps hingedly connected to the upper edges of respective said remaining two side walls and folded down over said inner flap extensions against the inner surfaces of the respective said remaining two side walls, and an article disposed in said carton and confined longitudinally between the bottom closure means and the inwardly projecting edges of said oblique flaps, with portions of said article bearing against the faces of said end flaps to thereby retain in place said inner flap extensions and said oblique flaps.

References Cited by the Examiner
UNITED STATES PATENTS

| | | | |
|---|---|---|---|
| 1,838,269 | 12/31 | Langford et al. | 229—38 |
| 2,391,753 | 8/42 | Patten. | |
| 2,979,192 | 4/61 | Blonder | 206—46 |

THERON E. CONDON, *Primary Examiner.*